United States Patent

Parquet et al.

[11] 4,033,870
[45] July 5, 1977

[54] DUAL OIL FILTER AUTOMATIC SWITCHING SYSTEM

[75] Inventors: Donald James Parquet; Carl Oluf Pedersen, both of Burlington, Iowa

[73] Assignee: J. I. Case Company, Racine, Wis.

[22] Filed: July 1, 1976

[21] Appl. No.: 701,903

[52] U.S. Cl. .................. 210/90; 210/103; 210/132; 210/149; 210/340
[51] Int. Cl.² ........................ B01D 29/36
[58] Field of Search ........... 210/85, 90, 103, 132, 210/137, 149, 340, 341

[56] References Cited
UNITED STATES PATENTS

| | | | |
|---|---|---|---|
| 2,423,329 | 7/1947 | Le Clair | 210/137 X |
| 2,522,502 | 9/1950 | Clark | 210/149 X |
| 3,341,019 | 9/1967 | Florkowski | 210/132 |
| 3,396,845 | 8/1968 | Bouskill | 210/341 X |
| 3,485,369 | 12/1969 | Voorheis | 210/132 X |
| 3,666,101 | 5/1972 | Rosaen | 210/90 |
| 3,979,292 | 9/1976 | Kuhn | 210/137 |

*Primary Examiner*—John Adee
*Attorney, Agent, or Firm*—Arthur J. Hansmann

[57] ABSTRACT

A dual oil filter automatic switching system incorporating two oil filters and a switching oil valve and an oil pump, all connected together. The system also includes electric means incorporating a differential pressure switch and a latching relay, and an electric signal and an electrically-operative temperature switch are also disclosed. The oil valve is electrically responsive to the electric switching, and the valve directs the oil to either or both of the filters.

8 Claims, 3 Drawing Figures

DUAL OIL FILTER AUTOMATIC SWITCHING SYSTEM

This invention relates to a dual oil filter automatic switching system, and, more particularly, the system of this invention can be applied to a tractor or a machine or like apparatus wherein it is important to have oil filtered, and it is important to know that the filters are clean and fully operative.

BACKGROUND OF THE INVENTION

The prior art reveals examples of the concern for an oil filtering system which responds to the situation of a contaminated filter. When the system and the filter are contaminated, the efficiency of the flow of oil, and even the operation of the system itself, are impeded, and it is therefore important that the oil filter be clean and that it be fully functional for its usual purpose of filtering the oil while allowing maximum flow of oil. Examples of prior art concern for a contaminated or clogged oil filter are found in U.S. Pat. Nos. 2,879,892 and 3,482,696 and 3,757,951. The latter patent shows a filter which automatically opens to allow a bypass flow of oil, in the event the filter element becomes clogged. The first two aforesaid patents show oil filter elements with electrical signals, such as warning lamps, which automatically operate in response to a clogged filter condition.

The present invention is also concerned with a signalling system for a clogged filter condition, and it is further concerned with an automatic switching arrangement whereby the oil can be directed from a valve to either or both of two oil filters incorporated in the system. That is, in one mode for the present system, oil can be directed to only one of the filters, and, when that one filter becomes contaminated or clogged, then the system will automatically operate to switch to direct the flow to the other clean filter. Simultaneous with the aforementioned, a signal, such as a warning light or the like, can be activated to notify the operator that the first filter is clogged and therefore needs changing. Additionally, the present system is arranged such that oil can be directed to both of the filters at one time, if and when that arrangement is desirable, and that time could be when the oil is cold and is therefore of a higher viscosity and would normally be impeded in its flow through a single filter element. Accordingly, the present invention incorporates a temperature switch which senses the temperature of the oil in the system and which therefore affects the setting of the valve which is directing the oil to the filters such that when the oil is cold, it can be directed to both of these filters, for the reason mentioned, and also when the cold oil is directed to both of the filters, there will be no false signal comparable to indicating that a filter is clogged, since the cold oil could act upon the system in the same manner that contaminated oil could act.

Accordingly, the primary objectives of this invention are to accomplish the aforementioned features, and the present invention therefore provides a dual oil filter automatic switching system which operates to switch the oil flow from a contaminated filter to a clean filter.

In summary, precision machinery utilizing hydraulic power requires filtration of the hydraulic fluid. If the filter is not changed when it is dirty, it will clog up and the oil will then bypass the filter and carry its dirt to the delicate machinery, or, if there is no bypass arrangement, the oil lines could break. Accordingly, it is common practice to have filter indicators or switches which operate warning devices to alert the operator of the clogging condition. However, if he does not notice the clogging condition, or if it is not convenient to change the filter, the filter continues to clog until the undesirable consequences occur. The present invention automatically switches the flow of oil from a clogged filter to a clean filter, and it energizes a signal which indicates the clogged condition and thereby informs the operator to replace the dirty filter. Still further, the present invention provides the dual filter arragement mentioned and wherein even the second filter is provided with a signal which will indicate to the operator when the second filter is clogged. Still further, the present invention provides a temperature sensitive device which takes into account the higher viscosity of cold fluid or oil, and the cold fluid or oil can be sensed so that the system will not falsely switch, or it can be sensed so that the system will set itself into a mode which simultaneously directs the fluid or oil to both of the filters.

Other objects and advantages will become apparent upon reading the following description in light of the accompanying drawings.

DETAILED DESCRIPTION OF THE PREFERRED EMBODIMENTS

Figure 1:
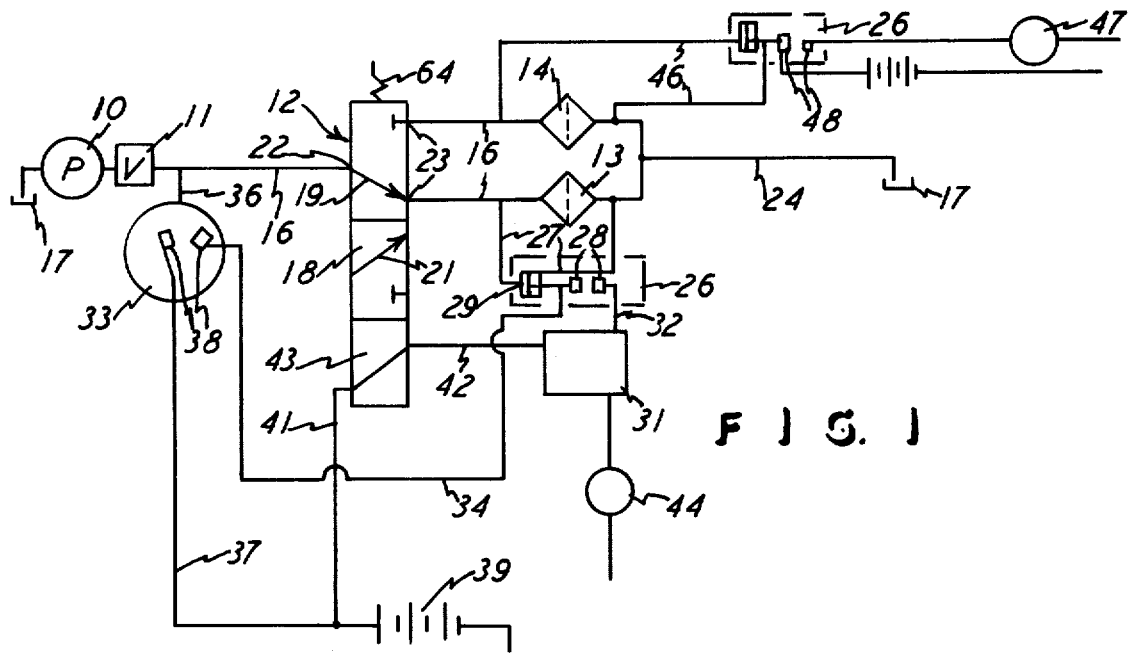
FIG. 1 is a diagrammatic view of one embodiment of the system constructed according to this invention.

FIG. 1 shows the system to include a hydraulic pump 10 and a machine or tractor or like valve 11 and an oil valve 12 and two oil filters 13 and 14. The aforementioned elements are hydraulically connected together, such as by the hydraulic lines designated 16, and the elements are also in fluid flow communication with an oil reservoir indicated at the locations designated 17. Thus, it will be seen and understood by one skilled in the art that the pump 10 pumps the oil, under pressure, to the valve 11 and 12 and consequently to the filters 13 and 14. Of course the filtered oil would also pass to the components and machinery to be lubricated, and such arrangement and connection could be in any suitable manner and is not needed to be shown herein, in order for one skilled in the art to understand that.

As further shown in FIG. 1, with the valve 12 being shown to be in the nature of a spool-type valve having a valve closure designated 18, the valve has fluid passageways 19 and 21 which can be selectively positioned for fluid-flow communicating the valve single inlet designated 22 with either of the two valve outlets designated 23, and consequently pass the flow to either of the two filters 13 and 14. Subsequently, the fluid will flow through the fluid line 24 and to the machinery to be lubricated or to the reservoir 17, as mentioned.

A fluid pressure actuated differential electric switch 26 is connected in parallel fluid connection with the filter 13 by means of fluid lines 27. As such, the switch 26 detects the fluid pressure drop across the filter 13, and the switch includes electric contacts designated 28. The fluid lines 27 connect with a fluid sensing element 29, and the entire arrangement is such that when the fluid pressure drop across the filter 13 is sufficiently high, such as when the filter 13 is clogged with dirt, then the sensor 29 is activated to close the electric contacts 28. One contact 28 is shown connected with an electric latching relay through an electric line 32, and the other contact 28 is shown connected with a temperature switch 33 through an electric line 34. Also, the switch 33 is a fluid pressure actuated switch and, as such, switch 33 avoids premature switching of the system for signaling connects with the fluid system through a fluid line 36. The switch 33 has two electric contacts 38, and one of the contacts is connected with the electric line 34 and the other of the contacts 38 is connected with the electric line 37 which in turn is connected with a battery or source of power designated 39. Finally, it will also be noticed that electric lines 41 and 42 extend respectively between the switch 33 and the latching relay 31 and to a solenoid 43 on the valve 12. The detailed arrangements of the switches 26 and 33 and the latching relay 28 are of a conventional arrangement, and they need not be further shown nor described in detail in order for one skilled in the art to understand the construction.

Accordingly, in operation, when the pressure drop across the filter 13 is sufficiently high, the pressure switch 26 will detect the high drop and cause the electric contacts 28 to close and this in turn will energize the latching relay 31, if the switch 33 has its contacts 38 in the closed position. Thus, an electric signal 44, which may be in the form of a light or a buzzer, will be electically energized and thus signal the operator that the filter 13 is clogged. Secondly, when the electric circuit is closed as described, the solenoid 43 will be energized and the valve 22 will thus be caused to shift so that the valve fluid passageway 21 will connect the lines 16 to thereby direct the flow to the filter 14, and the flow will no longer be directed to the filter 13. Of course where the filter 14 is a fresh and clean filter, the system will now continue to function and filter the oil or fluid flowing through the system.

Additionally, a differential pressure switch 26 can be located between the hydraulic lines designated 46 and connected on opposite sides of the filter 14 to thereby be energized when there is sufficient fluid pressure drop across the filter 14, such as when the filter 14 itself becomes clogged. Further, an electric signal 47 is connected with the switch 26, and thus the operator can again detect that a filter is clogged. The switch 26 connected with the filter 14 will operate to close its electric contacts 48 and thus energize the signal 47, and no temperature switch 33 is shown connected with the particular switch 26, though it could of course be included but is not fully necessary.

Figure 3:
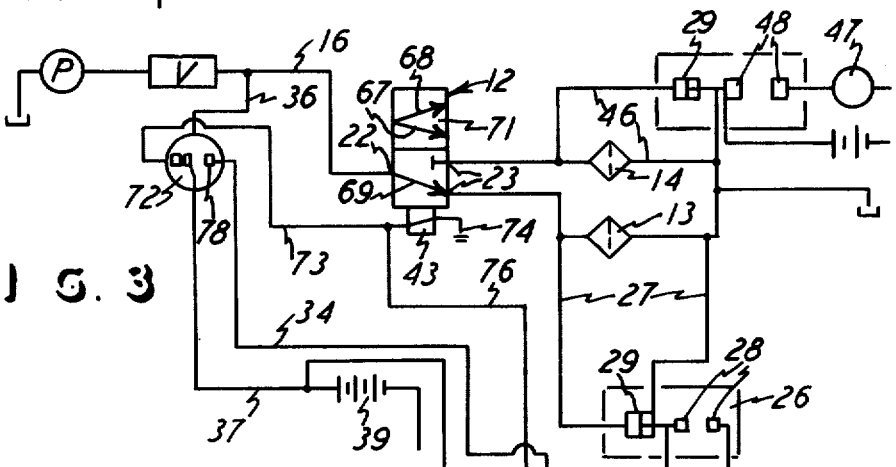
FIGS. 2 and 3 are diagrammatic views of other embodiments of the system.
Figure 2:
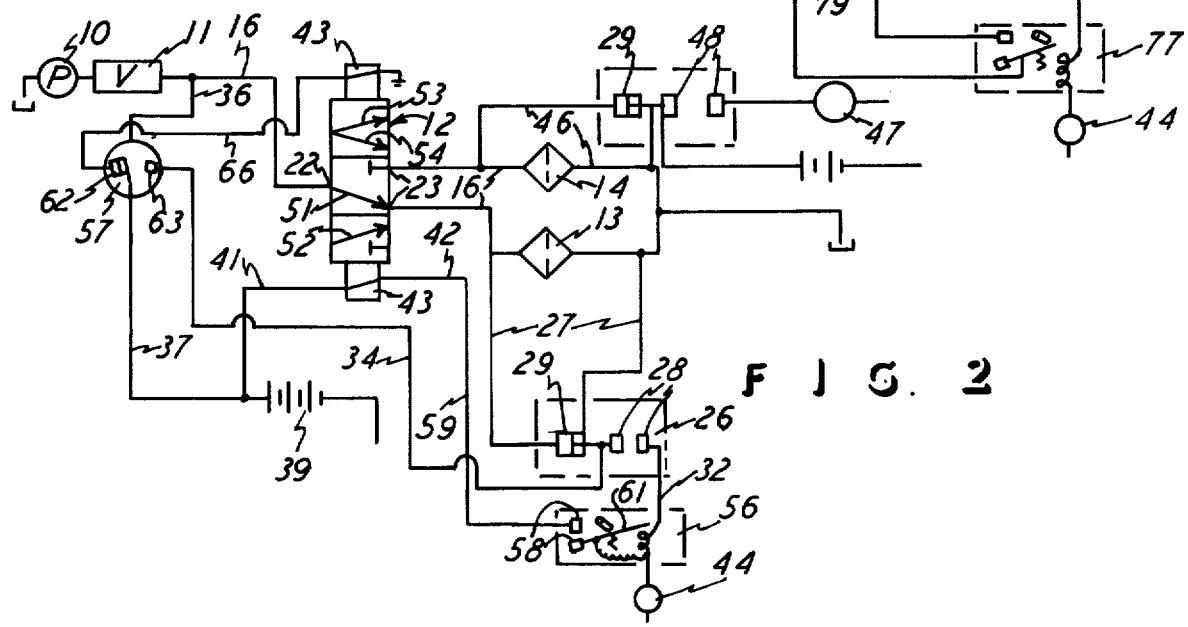

FIGS. 2 and 3 show other embodiments of the invention, and the elements generally similar to those shown in FIG. 1 are numbered the same in FIGS. 2 and 3. It will of course be seen and understood that the oil valve 12 and the latching relay and the temperature switch are somewhat different in FIGS. 2 and 3, compared to FIG. 1. FIG. 2 shows the valve 12 is a three-way and three-position valve, and it has two solenoids 43 on opposite ends of the spool type of closure shown, and it also has fluid passageways 51 and 52 and 53 and 54. In the position shown in FIG. 2, oil is flowing from the valve 11 and through the passageway 51 and thus to the filter 13. When the filter becomes clogged, the differential pressure switch 26 will detect the increase in fluid pressure and will cause the contacts 28 to close and this in turn will permit the energizing of the latching relay 56 and the temperature switch 57. The electric line 32 connects to the latching relay 56 which has its two electric contacts 58, with one thereof connected to the one solenoid 43, through an electric line 59, and with the other contact 58 being on the usual moving arm or member 61 in the relay 56 which is of a conventional arrangement. Also, the temperature switch 57 is subjected to the fluid temperature through the line 36, and it has a cold temperature contact 62 and a hot temperature contact 63, and the switch 57 is electrically connected to the solenoid 43 and the latching relay 56 as shown and such that when the switch 57 is in the position shown in FIG. 2 the upper solenoid 43 of the valve 12 is energized to thus cause the fluid passageways 53 and 54 to respectively flow communicate with the filters 14 and 13, since the two lines 53 and 54 have a common flow point where the lines are shown to come together, and that point will be in flow communication with the inlet 22, at that time. That is, when the oil is cold, then it can be directed to both of the filters 13 and 14 so that the high viscosity oil will not give a false signal in the system. Of course when the oil reaches its operating or higher temperature, then the switch 57 will actuate to where it makes connection with the contact 63, and, according to the electric system shown, the lower solenoid 43 will then be energized to thus set the valve 12 to where the fluid passageway 52 flow communicates with the inlet 22 and the filter 14, and that of course assumes that the differential pressure switch 26 has been activated. The latching relay 56 will retain the circuit closed, so that the signal 44 will be constantly energized until the operator opens the latching relay 56. Finally, when the pressure drop across the filter 13 is not sufficiently great, that is when the filter 13 is clean, then the valve 12 will be in the position shown in FIG. 2, and that will be its normal position urged by centering springs which are not shown, though a normal positioning compression spring 64 is shown in FIG. 1, and that spring will therefore cause the closure 18 of FIG. 1 to assume the position shown in FIG. 1, and the solenoid 43 will cause the closure 18 to shift to supply oil to the filter 14, as described in connection with FIG. 1. Also, FIG. 2 includes the electric line 66 which is suitably connected between the switch contact 62 and the upper solenoid 43, for controlling the spool-type closure in the valve 12 shown in FIG. 2.

FIG. 3 differs from the previous embodiments in that it shows the valve 12 to be a three-way and two-position valve, and again the valve 12 can supply both filters 13 and 14 simultaneously, such as through the fluid passageways 67 and 68 which have their common point of flow communication at the inlet 22, when the closure of the valve 12 is shifted downwardly, and, in that downward shifted position, the fluid will flow to both filters 13 and 14, but flow will go through only a clean filter and if one of the two filters is clogged then the flow will simply go through the other filter, and that dual flow position is also utilized for cold oil, as described in connection with FIG. 2. Also, the valve 12 of FIG. 3 shows a fluid passageway 69 which aligns only for flow to the filter 13, and the valve closure 71 can shift to the downward position and thus permit flow to go to the filter 14, as mentioned. In that FIG. 3 arrangement, the system includes a temperature switch 72 having an electric line 73 connected with a solenoid 43 which has a ground line 74. Also, there is an electric line 76 extending between the solenoid 43 and the latching relay designated 77. Therefore, when the differential pressure switch 26 is closed for passing current to the relay 77, and when the temperature switch 72 is in the cold setting position shown in FIG. 3, then current flows to the solenoid 43 and the latching relay 77 is closed, for the functions of shifting the valve 12 downwardly and for continuously energizing the signal 44, as mentioned above. Of course when the switch 72 shifts to the warm position to make connection with the warm contact 78, and when the filter 13 may be clogged and the pressure switch 26 is closed, then the circuit is again completed but in a mode to energize the solenoid 43 and cause the closure 71 to shift downwardly, and such connection is electically made through the latching relay 77 and the connecting electric lines 34 and 37 and 79 and the lines 76 and 74.

Accordingly, in the embodiments shown, there is provided the oil valve 12 which is under the influence of the electric responsive member, in the shown form of a solenoid, and the differential fluid pressure electric switch 26, which is a sensor, and the electric latching relays 28 and 56 and 77, along with the temperature responsive switches 33 and 62 and 72, all control the positioning of the valve 12.

What is claimed is:

1. A dual oil filter automatic switching system comprising two oil filters, an oil valve having an oil inlet and two oil outlets and having an electrically operative movable valve closure with a plurality of oil passageways for selective fluid-flow communication of said inlet with said two outlets, fluid lines separately interconnected between said two filters and each of said two outlets for diverting the flow of oil to said filters, an oil pump in fluid-flow communication with said oil valve for supplying oil under pressure to said inlet, a differential fluid pressure electric switch, additional fluid lines separately connected to said switch and the respective oil flow inlet and outlet sides of one of said filters for transmitting oil pressure to said switch for actuation of said switch in accordance with oil pressure at said one filter, and electric connections between said switch and said electrically operative closure for moving said closure and its said passageways relative to said two outlets to thereby direct the flow of oil relative to said two filters.

2. The dual oil filter automatic switching system as claimed in claim 1, wherein said oil valve is a multiple-way type valve, and said passageways include two passageways disposed in flow communication with each other at said inlet and arranged to be disposed with respective ones of said two outlets, for simultaneous fluid flow to said two filters.

3. The dual oil filter automatic switching system as claimed in claim 2, wherein said passageways include two passageways disposed free of flow communication with each other and separately positionable for respective flow communication with said inlet and a respective one of said two outlets.

4. The dual oil filter automatic switching system as claimed in claim 1, including a latching electric relay electrically connected with said fluid pressure electric switch, and an electric signal electrically connected with said relay for signalling the electric closing of said electric switch.

5. The dual oil filter automatic switching system as claimed in claim 1, including an electrically operative temperature switch fluid flow connected with said pump for receiving oil from said pump and having electric contacts which open and close in accordance with the temperature of the oil flowing to said temperature switch, and said fluid pressure electric switch and said temperature switch being electrically connected together for opening and closing the electric connection between said fluid pressure electric switch and said electrically operative valve closure.

6. The dual oil filter automatic switching system as claimed in claim 1, including an electric solenoid operatively associated with said valve closure for operating the latter, and said sensor including electric switch means operatively connected with said solenoid for energizing the latter.

7. The dual oil filter automatic switching system as claimed in claim 6, including an electrically operative temperature switch fluid flow connected with said pump for receiving oil from said pump and having electric contacts which open and close in accordance with the temperature of the oil flowing to said temperature switch, and said switch means and said temperature switch being electrically connected together for opening and closing the electric connection between said switch means and said solenoid.

8. The dual oil filter automatic switching system as claimed in claim 7, including a latching electric relay electrically connected with said switch means for maintaining an effectively closed electric connection across said switch means once said relay is electrically energized, and an electric signal electrically connected with said relay for signaling the closing of said switch means.

* * * * *